(12) United States Patent
Canova et al.

(10) Patent No.: US 7,387,752 B2
(45) Date of Patent: Jun. 17, 2008

(54) METHOD FOR PRODUCING SOLID CERAMIC PARTICLES USING A SPRAY DRYING PROCESS

(75) Inventors: Steve Canova, Gray, GA (US); Thomas C. Palamara, Eufaula, AL (US); Jimmy C. Wood, Eufaula, AL (US)

(73) Assignee: CARBO Ceramics Inc., Irving, TX (US)

(*) Notice: Subject to any disclaimer, the term of this patent is extended or adjusted under 35 U.S.C. 154(b) by 9 days.

(21) Appl. No.: 11/178,081

(22) Filed: Jul. 8, 2005

(65) Prior Publication Data

US 2006/0006589 A1    Jan. 12, 2006

Related U.S. Application Data

(60) Provisional application No. 60/586,809, filed on Jul. 9, 2004.

(51) Int. Cl.
*B28B 1/00* (2006.01)

(52) U.S. Cl. .................. 264/12; 264/13; 264/14; 264/661

(58) Field of Classification Search ............... 264/12, 264/13, 14, 117
See application file for complete search history.

(56) References Cited

U.S. PATENT DOCUMENTS

| | | | |
|---|---|---|---|
| 1,942,431 A | 1/1934 | Jung | |
| 2,566,117 A | 8/1951 | Christie et al. | |
| 2,699,212 A | 1/1955 | Dismukes | |
| 2,950,247 A | 8/1960 | McGuire, Jr. et al. | |
| 3,026,938 A | 3/1962 | Huitt et al. | |
| 3,075,581 A | 1/1963 | Kern | |
| 3,079,243 A | 2/1963 | Ueltz | |
| 3,126,056 A | 3/1964 | Harrell | |
| 3,241,613 A | 3/1966 | Kern et al. | |
| 3,242,032 A | 3/1966 | Schott | |
| 3,245,866 A | 4/1966 | Schott | |
| 3,347,798 A | 10/1967 | Baer et al. | |
| 3,350,482 A | 10/1967 | Bowers | |
| 3,437,148 A | 4/1969 | Colpoys, Jr. | |
| 3,486,706 A | 12/1969 | Weyand | |
| 3,491,492 A | 1/1970 | Ueltz | |

(Continued)

FOREIGN PATENT DOCUMENTS

AR    241543    8/1992

(Continued)

OTHER PUBLICATIONS

Perry's Chemical Engineers' Handbook Section 12, 7th Edition, 1997, pp. 12-81 to 12-90.*

(Continued)

*Primary Examiner*—Carlos Lopez
(74) *Attorney, Agent, or Firm*—Haynes and Boone, LLP

(57) ABSTRACT

Methods for producing solid, substantially round, spherical and sintered particles from a slurry of a calcined, uncalcined or partially calcined raw material having an alumina content of greater than about 40 weight percent. The slurry is processed with spray drying methods into solid, substantially round, spherical and sintered particles having an average particle size greater than about 200 microns, a bulk density of greater than about 1.40 g/cc, and an apparent specific gravity of greater than about 2.60.

15 Claims, 4 Drawing Sheets

U.S. PATENT DOCUMENTS

| | | |
|---|---|---|
| 3,497,008 A | 2/1970 | Graham et al. |
| 3,598,373 A | 8/1971 | Inman |
| 3,690,622 A | 9/1972 | Brunner et al. |
| 3,758,318 A | 9/1973 | Farris et al. |
| 3,810,768 A | 5/1974 | Parsons et al. |
| 3,856,441 A | 12/1974 | Suzukawa et al. |
| 3,890,072 A | 6/1975 | Barks |
| 3,976,138 A | 8/1976 | Colpoys, Jr. et al. |
| 4,051,603 A | 10/1977 | Kern, Jr. |
| 4,052,794 A | 10/1977 | Ganiaris |
| 4,053,375 A | 10/1977 | Roberts et al. |
| 4,068,718 A | 1/1978 | Cooke, Jr. et al. |
| 4,072,193 A | 2/1978 | Sarda et al. |
| 4,077,908 A | 3/1978 | Stenzel et al. |
| 4,104,342 A | 8/1978 | Wessel et al. |
| 4,140,773 A | 2/1979 | Stowell et al. |
| 4,268,311 A | 5/1981 | VerDow |
| 4,296,051 A | 10/1981 | Shimamura et al. |
| 4,303,204 A | 12/1981 | Weston |
| 4,343,751 A | 8/1982 | Kumar |
| 4,371,481 A | 2/1983 | Pollock |
| 4,396,595 A | 8/1983 | Heytmeijer et al. |
| 4,407,967 A | 10/1983 | Luks |
| 4,427,068 A | 1/1984 | Fitzgibbon |
| 4,439,489 A | 3/1984 | Johnson et al. |
| 4,440,866 A | 4/1984 | Lunghofer et al. |
| 4,442,897 A | 4/1984 | Crowell |
| 4,450,184 A | 5/1984 | Longo et al. |
| 4,462,466 A | 7/1984 | Kachnik |
| 4,493,875 A | 1/1985 | Beck et al. |
| 4,521,475 A | 6/1985 | Riccio et al. |
| 4,522,731 A | 6/1985 | Lunghofer |
| 4,547,468 A | 10/1985 | Jones et al. |
| 4,555,493 A | 11/1985 | Watson et al. |
| 4,618,504 A | 10/1986 | Bosna et al. |
| 4,623,630 A | 11/1986 | Fitzgibbon |
| 4,632,876 A | 12/1986 | Laird et al. |
| 4,639,427 A | 1/1987 | Khaund |
| 4,652,411 A | 3/1987 | Swarr et al. |
| 4,654,266 A | 3/1987 | Kachnik |
| 4,658,899 A | 4/1987 | Fitzgibbon |
| 4,668,645 A | 5/1987 | Khaund |
| 4,680,230 A | 7/1987 | Gibb et al. |
| 4,713,203 A | 12/1987 | Andrews |
| 4,714,623 A | 12/1987 | Riccio et al. |
| 4,744,831 A | 5/1988 | Beck |
| 4,879,181 A | 11/1989 | Fitzgibbon |
| 4,894,285 A | 1/1990 | Fitzgibbon |
| 4,911,987 A | 3/1990 | Sakata et al. |
| 4,921,820 A | 5/1990 | Rumpf et al. |
| 4,921,821 A | 5/1990 | Rumpf et al. |
| 5,030,603 A | 7/1991 | Rumpf et al. |
| 5,120,455 A | 6/1992 | Lunghofer |
| 5,175,133 A | 12/1992 | Smith et al. |
| 5,188,175 A | 2/1993 | Sweet |
| 5,266,243 A * | 11/1993 | Kneller et al. ................ 264/6 |
| 5,964,291 A | 10/1999 | Bourne et al. |
| 5,972,835 A | 10/1999 | Gupta |
| 6,059,034 A | 5/2000 | Rickards et al. |
| 6,074,754 A | 6/2000 | Jacobsen et al. |
| 6,080,232 A | 6/2000 | Sperlich et al. |
| 6,217,646 B1 | 4/2001 | Gervais |
| 6,330,916 B1 | 12/2001 | Rickards et al. |
| 6,364,018 B1 | 4/2002 | Brannon et al. |
| 6,372,678 B1 | 4/2002 | Youngman et al. |
| 6,503,676 B2 | 1/2003 | Yamashita et al. |
| 6,632,527 B1 | 10/2003 | McDaniel et al. |
| 6,725,930 B2 | 4/2004 | Boney et al. |
| 6,743,269 B2 | 6/2004 | Meyer et al. |
| 6,749,025 B1 | 6/2004 | Brannon et al. |
| 6,753,299 B2 | 6/2004 | Lunghofer et al. |
| 6,772,838 B2 | 8/2004 | Dawson et al. |
| 6,780,804 B2 | 8/2004 | Webber et al. |
| 2004/0040708 A1* | 3/2004 | Stephenson et al. ..... 166/280.1 |
| 2004/0200617 A1 | 10/2004 | Stephenson et al. |
| 2005/0028979 A1 | 2/2005 | Brannon et al. |
| 2005/0244641 A1 | 11/2005 | Vincent |
| 2006/0006589 A1 | 1/2006 | Canova et al. |

FOREIGN PATENT DOCUMENTS

| | | |
|---|---|---|
| AR | 243222 | 7/1993 |
| AU | 551409 | 1/1983 |
| CA | 1045027 | 12/1978 |
| CA | 1172837 | 8/1984 |
| CA | 1191020 | 7/1985 |
| CA | 1194685 | 10/1985 |
| CA | 1232751 | 2/1988 |
| CA | 2444826 | 4/2004 |
| DE | 2948584 | 6/1980 |
| DK | 168099 | 7/1983 |
| EP | 0083974 | 7/1983 |
| EP | 0087852 | 9/1983 |
| EP | 0101855 | 3/1984 |
| EP | 0116369 | 8/1984 |
| EP | 0169412 | 1/1986 |
| FR | 2486930 | 1/1982 |
| GB | 578424 | 7/1946 |
| GB | 715354 | 9/1954 |
| GB | 715882 | 9/1954 |
| GB | 886342 | 1/1962 |
| GB | 992237 | 5/1965 |
| GB | 1033143 | 6/1966 |
| GB | 1411135 | 10/1975 |
| GB | 1421531 | 1/1976 |
| GB | 2037727 | 7/1980 |
| GB | 2079261 | 1/1982 |
| GB | 2092561 | 10/1983 |
| MX | 161299 | 9/1990 |
| PE | 003273 | 11/1983 |
| PH | 18450 | 7/1985 |
| RU | 2014281 | 6/1994 |
| RU | 2079471 | 5/1997 |
| RU | 2083528 | 7/1997 |
| RU | 2090537 | 9/1997 |
| RU | 2098387 | 12/1997 |
| RU | 2098618 | 12/1997 |
| RU | 2099661 | 12/1997 |
| RU | 2107674 | 3/1998 |
| RU | 2112189 | 5/1998 |
| RU | 2112761 | 6/1998 |
| RU | 2121988 | 11/1998 |
| RU | 2129987 | 5/1999 |
| RU | 2133716 | 7/1999 |
| RU | 2140874 | 11/1999 |
| RU | 2140875 | 11/1999 |
| RU | 2147564 | 4/2000 |
| RU | 2147565 | 4/2000 |
| RU | 2147717 | 4/2000 |
| RU | 2150442 | 6/2000 |
| RU | 2151124 | 6/2000 |
| RU | 2151125 | 6/2000 |
| RU | 2151987 | 6/2000 |
| RU | 2154042 | 8/2000 |
| RU | 2155735 | 9/2000 |
| RU | 99107936 | 1/2001 |
| RU | 2163227 | 2/2001 |
| RU | 2166079 | 4/2001 |
| RU | 2168484 | 6/2001 |
| RU | 2178924 | 1/2002 |
| RU | 2180397 | 3/2002 |
| RU | 2183370 | 6/2002 |
| RU | 2183739 | 6/2002 |
| RU | 2191167 | 10/2002 |

| | | |
|---|---|---|
| RU | 2191169 | 10/2002 |
| RU | 2191436 | 10/2002 |
| RU | 2192053 | 10/2002 |
| RU | 2196675 | 1/2003 |
| RU | 2196889 | 1/2003 |
| RU | 2198860 | 2/2003 |
| RU | 2203248 | 4/2003 |
| RU | 2206930 | 6/2003 |
| RU | 2211198 | 8/2003 |
| RU | 2212719 | 9/2003 |
| RU | 2215712 | 11/2003 |
| RU | 2003100030/03 | 11/2003 |
| RU | 2002117351 | 1/2004 |
| RU | 2229456 | 5/2004 |
| RU | 2229458 | 5/2004 |
| VE | 48083 | 7/1990 |
| VE | 49128 | 2/1993 |
| WO | WO 2005/100007 | 10/2005 |
| WO | WO 2006/010036 | 1/2006 |

OTHER PUBLICATIONS

U.S. Appl. No. 60/407,734, Stephenson et al.

U.S. Appl. No. 60/428,836, Stephenson et al.

U.S. Appl. No. 60/569,067, Brannon et al.

Office Action issued by the U.S. Patent and Trademark Office on Mar. 19, 2004, in connection with U.S. Appl. No. 10/268,169.

Office Action issued by the U.S. Patent and Trademark on Mar. 1, 2006, in connection with U.S. Appl. No. 11/103,777.

International Search Report issued by the ISA/US on Mar. 14, 2006 in connection with International Application No. PCT/US05/12256.

Written Opinion of the International Searching Authority issued by the ISA/US on Mar. 14, 2006 in connection with International Application No. PCT/US05/12256.

Determining Feasibility of Fabricating Light Weight Proppants for Application in Gas and Oil Well Stimulation, Progress Report 10, DOE Contract DE-AC19-79BC10038, Submitted by Terra Tek, Inc., TR 80-77, Jul. 1980.

Light Weight Proppants for Deep Gas Well Stimulation, 2$^{nd}$ Annual Report, Jul. 1, 1980-Jun. 30, 1981, published Apr. 1982, DOE Contract AC19-79BC10038, by R.A. Cutler et al, Terra Tek, Inc.

Oxide Ceramic Proppants for Treatment of Deep Well Fractures, SPE 6816, by E.A. Neel, J.L. Parmley, and P.J. Colpoys, Jr. (1977).

Chemical Abstracts, vol. 85, No. 24, Dec. 13, 1976.

Hydraulic Fracturing with a High-Strength Proppant, Claude E. Cooke, Society of Petroleum Engineers of AIME, SPE 6213, 1976.

The Effect of Various Proppants and Proppant Mixtures on Fracture Permeability, Robert R. McDaniel, et al., SPE 7573, 1978.

UCAR Ceramic Props, The Ideal Proppant for Deep Wells and High Compaction Pressures, date unknown.

DOE Progress Review No. 21 for reporting period Oct. 1-Dec. 31, 1979, Determining Feasibility of Fabricating Light Weight Proppants for Application in Gas and Oil Well Stimulation.

DOE Progress Review No. 22 for reporting period Jan. 1-Mar. 31, 1980, Determining Feasibility of Fabricating Light Weight Proppants for Application in Gas and Oil Well Stimulation.

DOE Progress Review No. 23 for reporting period Apr. 1-Jun. 30, 1980, Determining Feasibility of Fabricating Light Weight Proppants for Application in Gas and Oil Well Stimulation.

DOE Progress Review No. 24 for reporting period Jul. 1-Sep. 31, 1980, Determining Feasibility of Fabricating Light Weight Proppants for Application in Gas and Oil Well Stimulation.

DOE Progress Review No. 26 for reporting period Jan. 1-Mar. 31, 1981, Determine Feasibility of Fabricated Light Weight Proppants for Application in Gas and Oil Well Stimulation.

DOE Progress Review No. 27 for reporting period Apr. 1-Jun. 30, 1981, Determining Feasibility of Fabricating Light Weight Proppants for Application in Gas and Oil Well Stimulation.

Determining Feasibility of Fabricating Light Weight Proppants for Application in Gas and Oil Well Stimulation, Progress Report 2, DOE Contract DE-AC19-79BC10038, Submitted by Terra Tek, Inc., TR 79-77, Oct. 1979.

Light Weight Proppants for Deep Gas Well Stimulation, A. H. Jones et al, Terra Tek, Inc., Jun. 1980, TR Report 80-47.

New Proppants for Deep Gas Well Stimulation, SPE 9869, by Raymond A. Cutler, et al., 1977.

Effect of Grinding and Firing Treatment on the Crystalline and Glass Content and the Physical Properties of Whiteware Bodies; S. C. Sane, et al., 1951.

Nepheline Syenite-Talc Mixtures as a Flux in Low-Temperature Vitrified Bodies; E. D. Lynch, et al., Apr. 1950.

Engineering Properties of Ceramics, Databook to Guide Materials Selection for Structural Applications, J. F. Lynch, et al., TR 66-52, Jun. 1966.

Reactions in Silica-Alumina Mixtures, Richard R. West, et al., Apr. 1958.

Synthesis and Mechanical Properties of Stoichiometric Aluminum Silicate (Mullite), K. S. Mazdiyasni, et al., Dec. 1972.

Coors Porcelain Company letter to Halliburton Services, Inc. dated Aug. 4, 1978 with Proposal to Supply Proppant.

Coors Porcelain Company letter to B. J. Hughes, Inc. dated Aug. 24, 1978 with Proposal to Supply Proppant.

Unimin Brochure, Unimin Canada Ltd., Mar. 1991.

Role of Impurities on Formation of Mullite from Kaolinite and $Al_2O_3$-$S_1O_2$ Mixtures, Johnson, Sylvia M. et al., Ceramic Bulletin, vol. 61, No. 8 (1982), pp. 838-842.

Bauxite and Alumina, Luke H. Baumgardner, et al., Minerals Yearbook, 1987, vol. I.

The Industrial Uses of Bauxite, N. V. S. Knibbs, D.Sc., 1928.

Bauxite, Cyril S. Fox, 1927.

Pages from The National Atlas of the United States of America, 1991.

Document entitled "Feb., Mar., Apr. 1998: Commercial Activity", with Exhibits A-D.

Document entitled "Jul. 1998: Commercial Activity", with Exhibits E.

Document entitled "Sep. 2001: Commercial Activity", with Exhibits F.

ScalePROP brochure, Schlumberger, Jan. 2002.

Rickards, A. R., et al.; "High Strength, Ultra Lightweight Proppant Development Lends New Dimensions to Hydraulic Fracturing Applications", SPE 84308, Oct. 7, 2003.

Didion International, Inc.; Mold & Core Consumables; http://www.moderncasting.com/MoreInfo/0602/FMI_Article_08.asp; Dec. 27, 2002.

Itochu Ceratech Corp.; Ceramics and Minerals Department; http://www.itc-cera.co.jp/english/cera.htm; Jun. 8, 2002.

Enprotech Corp; About Enprotech; http:www.enprotech.com/aboutus.html; Copyright 2004.

Spraying Systems Co.; Air Atomizing Nozzles 1/2J Pressure Spray Set-ups Internal Mix; Air Atomizing Nozzles 1/2J Series External Mix Set-ups; Air Atomizing Nozzles 1/2J Siphon/Gravity-Fed Spray Set-ups; pp. 358-362; Copyright 2003.

Spraying Systems Co.; Air Atomizing Nozzles 1/8J and 1/4J Set-ups External Mix; pp. 282-285; Copyright 2003.

Spraying Systems Co.; Air Atomizing Nozzles Basic Information; pp. 268-269; Copyright 2003.

Spraying Systems Co.; Engineer's Guide to Spray Technology; Copyright 2000.

Environmental Conservation-Oriented Businessess; ITOCHU Corporation; pp. 11-16; Jul. 2004.

Itochu Ceratech Corporation; CERABEADS—Spherical Ceramic Sand; http://exhibits.gifa.de/exh/GMTN2003/e/3231240; Mar. 13, 2005.

Naigai Ceramics Co., Ltd.; Naigai Cerabeads 60; Aug. 1986.

\* cited by examiner

FIG. 1

```
100 ← SLURRY PREPARATION
          ↓
102 ← ATOMIZATION
          ↓
104 ← CONTACT
          ↓
106 ← DRYING
          ↓
108 ← DISCHARGE
          ↓
110 ← SINTER
```

US 7,387,752 B2

METHOD FOR PRODUCING SOLID CERAMIC PARTICLES USING A SPRAY DRYING PROCESS

CROSS-REFERENCE TO RELATED APPLICATIONS

This patent application is a non-provisional of U.S. Patent Application No. 60/586,809, filed on Jul. 9, 2004, entitled "Method for Producing Solid Ceramic Particles Using a Spray Drying Process," which is incorporated by reference herein in its entirety.

BACKGROUND

Spray drying involves the atomization of a ceramic fluid feedstock into sprays of droplets, which are dried to individual powder particles on contact with hot air. Primarily utilized in the ceramic tile and dinnerware industry, called the whiteware industry, spray drying is found in many industrial applications including electronic ceramics (semiconductors, capacitors) and structural ceramics (wear parts, cutting tools, biomedical parts).

Oil and natural gas are produced from wells having porous and permeable subterranean formations. The porosity of the formation permits the formation to store oil and gas, and the permeability of the formation permits the oil or gas fluid to move through the formation. Permeability of the formation is essential to permit oil and gas to flow to a location where it can be pumped from the well. Sometimes the permeability of the formation holding the gas or oil is insufficient for economic recovery of oil and gas. In other cases, during operation of the well, the permeability of the formation drops to the extent that further recovery becomes uneconomical. In such cases, it is necessary to fracture the formation and prop the fracture in an open condition by means of a proppant material or propping agent. Such fracturing is usually accomplished by hydraulic pressure, and the proppant material or propping agent is a particulate material, such as sand, glass beads or ceramic particles, which are carried into the fracture by means of a fluid.

Described herein are methods for making solid ceramic particles that are substantially round and spherical using a spray drying process. When sintered, the solid ceramic particles are suitable for use as proppant material.

BRIEF DESCRIPTION OF THE DRAWINGS

FIG. 1 is a diagram of a method for making sintered solid ceramic particles that are substantially round and spherical using a spray drying process as described herein.

DETAILED DESCRIPTION

Figure 2:
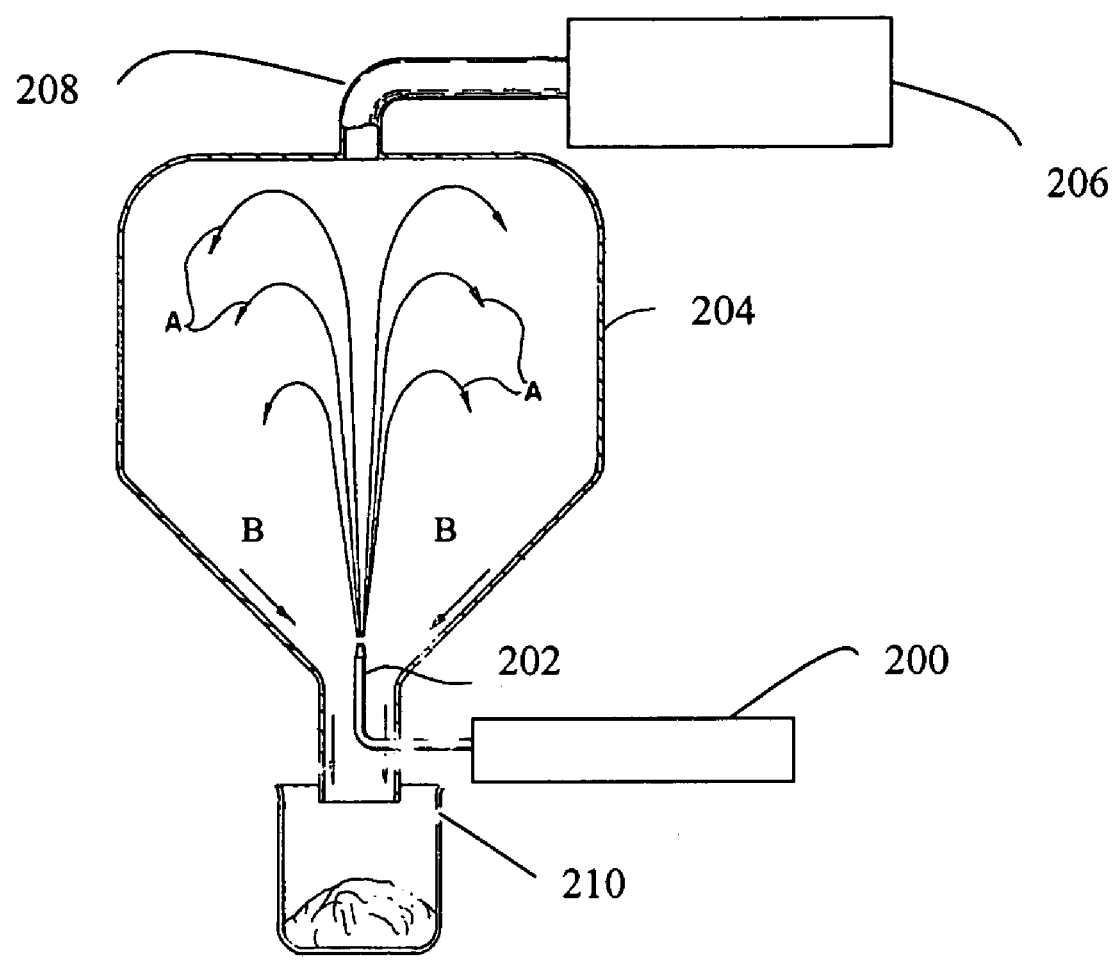
FIG. 2 illustrates a drying chamber providing a combination of co-current and counter-current flow for use in spray drying methods as described herein.

In particular, methods for making substantially round and spherical, solid, sintered ceramic particles having an average particle size of greater than about 200 microns, a bulk density of greater than about 1.40 g/cc, and an apparent specific gravity of greater than about 2.60 are described. In certain embodiments, the particles have an average particle size of greater than about 300 microns, or greater than about 400 microns. As used herein, the phrase "average particle size" describes a particle size calculated from the sieve distribution of a batch of the particles.

As used herein, the phrase "solid ceramic particle" describes ceramic particles having an interior void that is less than about 10% by volume of the particle. In certain embodiments, the solid ceramic particles have an interior void that is less than about 5% by volume of the particle.

Referring now to FIG. 1, a method for making a solid ceramic particle that is substantially round and spherical using a spray drying process includes slurry preparation 100, atomization 102, contact 104, drying 106, discharge 108, and sinter 110.

In slurry preparation 100, a slurry is prepared comprising water and a ceramic starting material having an alumina content of greater than about 40 weight percent. The slurry is prepared by blending, mixing, agitating or similar means known to those of ordinary skill in the art. The ceramic starting material may be an uncalcined ceramic material, partially calcined ceramic material, calcined ceramic material, or combinations thereof. In certain embodiments, the ceramic starting material is a material from which a solid ceramic particle that is substantially round and spherical can be made, and which contains naturally-occurring volatiles, which volatiles may include moisture, organics and chemically bound water (also referred to as "water of hydration"). In certain embodiments, the amount of naturally-occurring volatiles is from about 10 to about 40 wt. % of the ceramic starting material. In other embodiments, the ceramic starting material is an uncalcined clay, partially calcined clay, calcined clay, or mixtures thereof. In still other embodiments, the ceramic starting material is a kaolin clay, bauxitic clay, or bauxite, any of which may be calcined, partially calcined, or uncalcined, and mixtures thereof.

In certain embodiments, the slurry further comprises a binder, such as polyvinyl alcohol, polyvinyl acetate, methylcellulose, dextrin and molasses. Binders are typically organic materials used to increase particle strength. In certain embodiments, water can act as a binder.

In still other embodiments, the slurry further comprises a dispersant, such as a colloid, a polyelectrolyte, tetra sodium pyrophosphate, tetra potassium pyrophosphate, polyphosphate, ammonium citrate, ferric ammonium citrate and sodium hexametaphosphate. Dispersants are included to enhance the total solids content of the slurry by reducing the slurry viscosity. The amount of dispersant, if any, to be used in a slurry is balanced between the ability to atomize the slurry and the ability to make solid, spherical particles.

The relative quantities of ceramic starting material, water, binder (if any) and dispersant (if any) in the slurry depend on the desired properties for the solid ceramic proppant, but are limited to those amounts that will make the slurry suitable for pumping through a pressure nozzle or rotating wheel in atomization process 102, and will allow for the production of green particles that can be sintered to form solid ceramic particles that are substantially round and spherical. In certain embodiments, the slurry has a solids content in the range of from about 50 to about 75% by weight, while in other embodiments, the solids content is from about 50 to about 60% by weight, or from about 60% to about 70% by weight.

In embodiments where the slurry comprises a binder, the amount of binder can be less than about 0.5 percent, by weight of the dry ceramic starting material, or less than about 1.0 percent, by weight of the dry ceramic starting material.

In embodiments where the slurry comprises a dispersant, the amount of dispersant can be less than about 0.3 percent, by weight of the dry ceramic starting material, less than about 0.5 percent, by weight of the dry ceramic starting material, or less than about 1.0 percent, by weight of the dry ceramic starting material.

In atomization process 102, the slurry is fed to atomizing equipment. Suitable atomizing equipment includes but is not limited to a rotary wheel atomizer, a pressure nozzle atomizer and a dual fluid nozzle atomizer. Rotary wheel, pressure nozzle and dual fluid nozzle atomizers are known to those of ordinary skill in the art, and include those in spray dryers commercially available from a variety of sources, such as Niro, Inc. Nozzle design is known and understood by those of ordinary skill in the art, e.g. K. Masters: "Spray Drying Handbook", John Wiley and Sons, New York (1979).

Whether to use a rotary wheel, pressure nozzle, or dual fluid nozzle atomizer depends upon properties, such as size, distribution, and shape, desired in the final dried solid ceramic particle along with the desired production capacity. Generally, rotary wheel atomizers produce fine particles, while pressure nozzles and dual fluid nozzles operated under pressure can produce comparatively larger particles.

When a rotary wheel atomizer is used, ceramic slurry is fed to the center of the rotating wheel of the atomizer, and moves to the periphery of the wheel by centrifugal force. Atomization takes place at the wheel edge. The size of droplets and the size distribution of droplets in the resulting spray depend upon the amount of energy imparted to the slurry and the frictional effects between the newly formed droplets and the turbulent air flow near the wheel. Sprays of droplets are ejected horizontally from the wheel but quickly follow the airflow patterns created by an air disperser, which directs the hot air down into a drying chamber in a controlled manner. The particle size of ceramics produced in spray dryers with rotary wheel atomizers increases with decrease in atomizer wheel speed. The effect of feed rate is not great within the optimum working range of the given atomizer wheel, and fluctuations in feed rate during operation do not change the size distribution of the ceramic powder produced. Chamber diameters used with rotary wheel atomizers should generally be large enough to prevent the formation of semi wet deposits at the chamber wall at the atomizer level. In contrast, chambers of smaller diameter but larger cylindrical height can be used with pressure nozzle and dual fluid nozzle atomizers.

When a pressure nozzle atomizer is used, slurry is fed to the nozzle under pressure. In the case of a dual fluid nozzle, slurry and drying air are fed through separate nozzles. The feed of air is pressurized, while the feed of slurry can be pressurized or a siphon/gravity feed. In the embodiments described herein as using a dual fluid nozzle, the slurry feed was pressurized.

The pressure energy is converted into kinetic energy, and the slurry flows from the nozzle orifice as a high-speed film that readily disintegrates into droplets. The droplet size produced from a pressure nozzle atomizer or pressurized dual fluid nozzle varies inversely with pressure and directly with feed rate and feed viscosity. The capacity of a pressure nozzle or pressurized dual fluid nozzle varies with the square root of pressure. In certain embodiments where high feed rates and/or high-capacity spray drying is desired, multi-nozzle systems are used.

Turning now to contact 104, a spray of droplets of slurry exiting the atomizing equipment meets hot drying air entering a drying chamber. How the droplets and drying air are initially contacted, and how the droplets/particles move throughout the drying chamber can generally be described as either co-current, counter-current, or a combination thereof. In certain embodiments, such as the one illustrated in FIG. 2, a drying chamber providing a combination of co-current and counter-current flow is illustrated in use with a pressure nozzle atomizer.

FIG. 2 is a simplified diagram of a spray drying apparatus comprising a drying chamber 204 and a pressure nozzle 202. Spray dryers typically include additional components, which need not be detailed herein, as spray dryers and their components are known to those of ordinary skill in the art. In FIG. 2, slurry is fed from a feed source 200 through a pressure nozzle 202. Although only one pressure nozzle is illustrated in FIG. 2, multiple nozzles can be used. Various types of equipment suitable for feeding a slurry are known to those of ordinary skill in the art, and can include, for example, a feed pump with or without a filter. The pressure nozzle 202 atomizes the slurry into droplets and sprays the droplets upward into the dryer chamber 204, which is illustrated by arrows A. Hot air is fed into the drying chamber 204 from an air source 206, through an inlet 208 and enters the drying chamber 204 where it contacts the slurry droplets. Thus, the hot air enters from a point above the point at which the slurry is sprayed into the drying chamber, and flows in a generally downward direction in the chamber. Initially, the slurry droplets flow in a generally upward direction in the drying chamber, thereby establishing a counter-current flow. At some point, however, the droplets will exhaust their vertical trajectory, and begin to flow in a generally downward direction in the chamber, thereby establishing a co-current flow. Droplets in a drying chamber such as that illustrated in FIG. 2 have an extended vertical trajectory, which allows a longer airborne time for drying. Although FIG. 2 illustrates a pressure nozzle atomizer in use with a combination co-current and counter-current drying chamber, such drying chambers can also be used with rotary wheel atomizers and dual fluid nozzle atomizers.

Figure 3:
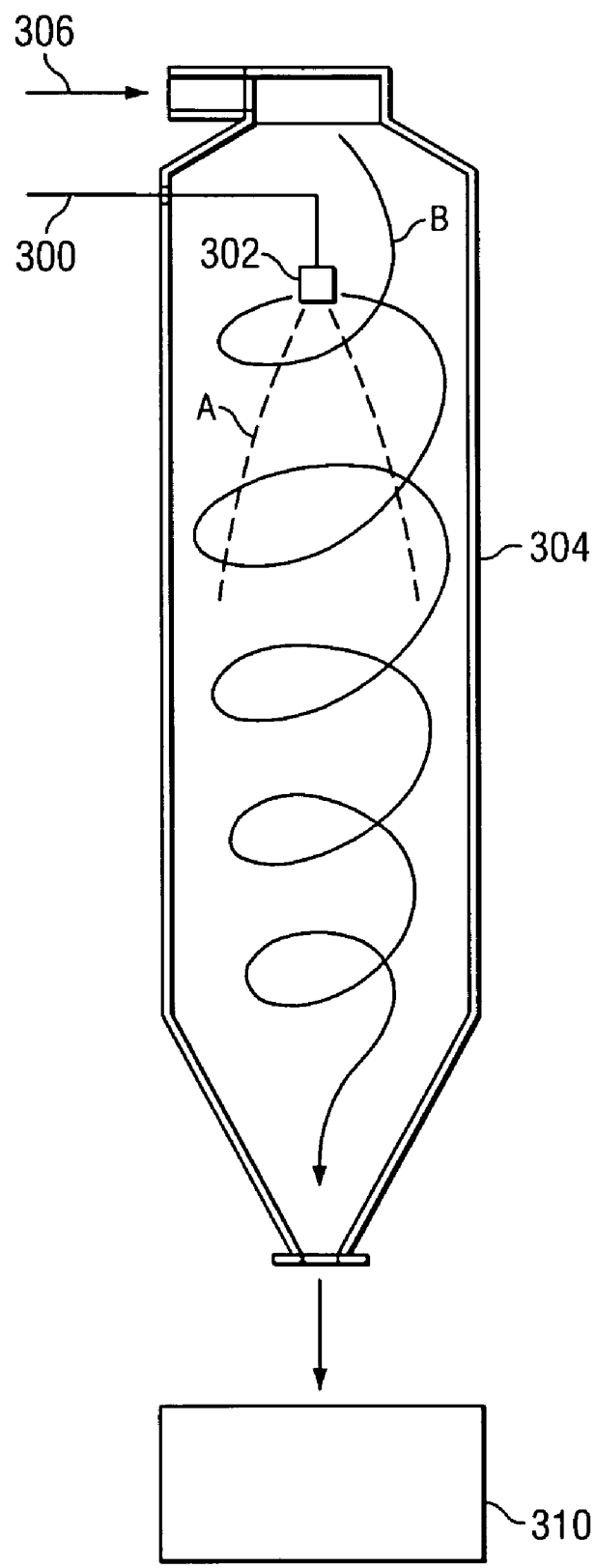
FIG. 3 illustrates a drying chamber providing a co-current flow for use in spray drying methods as described herein.
Figure 4:
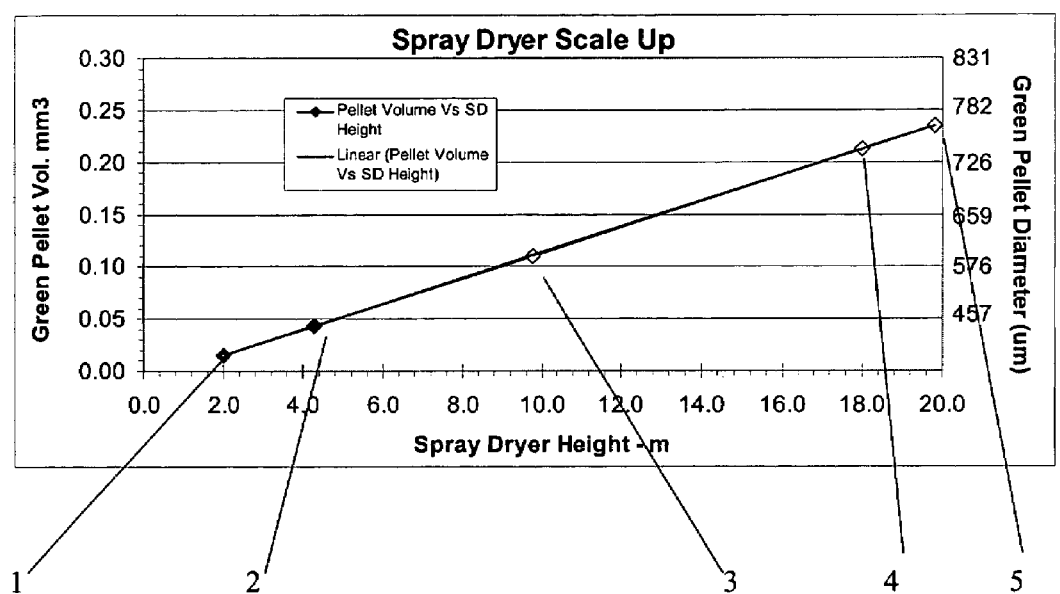
FIG. 4 illustrates a dimensional scale-up of drying chambers for making solid ceramic particles that are substantially round and spherical using a spray drying process as described herein.

In certain embodiments, such as that illustrated in FIG. 3, a co-current drying chamber is used with a pressure nozzle atomizer. FIG. 3 is a simplified diagram of a spray drying apparatus comprising a drying chamber 304 and a pressure nozzle 302. Slurry is fed from a feed source 300 through a pressure nozzle 302. The pressure nozzle 302 atomizes the slurry into droplets and sprays the droplets in a generally downward direction (illustrated at "A") into the dryer chamber 304. Hot air is fed into the drying chamber 304 from an air source 306, and flows into the drying chamber 304 in a generally downward direction (illustrated at "B"). Thus, the hot air and the slurry droplets flow in a generally downward direction in the chamber, thereby establishing a co-current flow. Although FIG. 3 illustrates a pressure nozzle atomizer in use with a co-current drying chamber, co-current drying chambers can also be used with rotary wheel atomizers and dual fluid nozzle atomizers.

Various types of equipment suitable for feeding hot air into the drying chamber for drying of the droplets are known to those of ordinary skill in the art, and can include, for example, a heater with or without an air filter. In drying 106, green ceramic particles form as moisture is evaporated from the droplets. As the slurry is sprayed into drying chamber 204 and contacts hot drying air, evaporation from the surface of the droplet occurs and a saturated vapor film forms at the surface of the droplet. Dispersants and binders, if present, are soluble. Thus, when a dispersant and/or binder is present, each atomized spray droplet contains both insoluble ceramic material and soluble additives. During the evaporation phase of spray drying, the soluble binding materials coat themselves in a film on the droplet surface.

As drying continues, moisture toward the interior of the droplet evaporates. According to the methods described herein, moisture from the interior of the droplet is evaporated at least in part by diffusion through the solid particles packed in the droplet, toward the droplet surface, and then through the film on the droplet surface. As evaporation of moisture from the droplet interior occurs, the film on the droplet surface grows inward toward the droplet interior.

Droplet surface temperatures are low in spite of the relatively higher inlet air temperature of the drying air. Evaporation takes place initially under constant-rate conditions, but then the rate falls as the droplets approach a final residual moisture content condition. Since the droplets contain undissolved solids, the drying profile features a significant constant-rate period that contributes to the particle sphericity. During drying, the spray droplet size distribution changes as droplets change size during evaporation of moisture. Coalescence of droplets and particles can also occur, and may be due to the turbulent air flow pattern in the drying chamber and the complex distribution of temperature and humidity levels.

Because the droplets generally do not rotate as they are projected through the drying chamber, one side of the droplet can be exposed to air from the inlet that is hotter than the air to which the other side of the droplet is exposed (referred to herein as the "hot side" and the "cool side", respectively). In such instances, evaporation is faster on the hot side, and the film that forms on the surface of the droplet thickens more rapidly on the hot side than on the cool side. Liquid and solids in the droplet migrate to the hot side. At this point, it would be expected that the cool side would be drawn inward, which would result in a hollow green particle with a dimple, rather than the solid green particles described herein. However, according to the methods described herein, the particles are solid rather than hollow because of one or more of the following factors: solids content in the weight percents described herein, solubles content (dispersant and/or binder) in the weight percents described herein, and air inlet temperatures in the ranges as described herein.

Regarding the solids content, slurries having solids contents greater than about 50 weight percent can be used to produce solid substantially round and spherical particles as described herein. According to certain embodiments, slurries having a solids content of about 60% to about 70% by weight can be used to produce solid substantially round and spherical particles.

Regarding the solubles content, binders increase slurry viscosity, which can lead to the need to reduce the solids content in order to maintain a slurry that can be atomized. Lower solids content, however, can lead to a particle that is not solid. As for dispersants, dispersants allow more rapid movement of solids to the surface of the particle, which can also lead to a particle that is not solid. Thus, the solubles content in a slurry (amounts of additives such as binders and dispersants) should be balanced against the solids content of the slurry. Preferably, the least amount of binder and/or dispersant, as determined by the need to adjust viscosity of the slurry, is used.

Regarding the air inlet temperatures, the temperature of the air entering a drying chamber is controlled according to methods described herein. Thus, in certain embodiments, the air inlet temperature is in a range of from about 100° C. to about 200° C., or from about 200° C. to about 300° C., or from about 300° C. to about 400° C., or from about 400° C. to about 500° C. In other embodiments, the air inlet temperature is in a range of from about 150° C. to about 200° C. or from about 200° C. to about 250° C. Preferably, temperatures in the lower end of such ranges are used in order to slow the rate of drying of the particles, which in turn contributes to the production of green ceramic particles that can be sintered to produce solid ceramic particles that are substantially round and spherical.

Referring again to FIG. 1, discharge 108 includes separation and discharge of green ceramic particles from the dryer chamber. In certain embodiments, a two-point discharge system is used. In a two-point discharge system, primary discharge of the coarsest fraction of the green ceramic particles is achieved from the base of the chamber and discharge of the finer fraction is achieved from the base of a cyclone and baghouse system. In certain other embodiments, a single-point discharge system is used. In a single-point discharge system, recovery of the green ceramic particles is accomplished from the dryer chamber. For example, in the schematic illustrated in FIGS. 2 and 3, the green ceramic particles are discharged from the drying chamber into a discharge 210 and 310 at least in part under the influence of gravity.

In addition to the components illustrated in FIGS. 2 and 3, suitable drying arrangements can further include fans and ducts, exhaust air cleaning equipment (cyclones, baghouses, scrubbers), and control instrumentation. Such further components and equipment, and their use in a spray drying method as described herein, are known to those of ordinary skill in the art.

After discharge 108, the green ceramic particles are then sintered 110 using conventional sintering equipment to form solid ceramic particles that are substantially round and spherical. Sintering and equipment to perform sintering are known to those of ordinary skill in the art. For example, see U.S. Pat. No. 4,427,068 to Fitzgibbon. In certain embodiments, sintering is performed at a temperature in the range of from about 1000° C. to about 1600° C. for a time in the range of from about 20 to about 45 minutes at peak temperature.

The following examples are illustrative of the methods and particles discussed above.

EXAMPLE 1

Referring now to Table 1 below, the results of nine test runs that produced substantially round and spherical solid ceramic particles according to the methods disclosed herein are reported. Values reported in Table 1 as "n/a" were not determined.

Nine slurries having the Slurry Properties reported in Table 1 were prepared by and obtained from CARBO Ceramics, Inc., ("CARBO") Eufaula, Ala. Generally, the slurries were prepared by agitating an uncalcined bauxitic kaolin clay with water and a dispersant in a Denver attrition scrubber to achieve a slurry having the reported solids content. The clay had an alumina content of greater than about 50 weight percent, and was a blend of clay mined in the Eufaula, Ala. area. The dispersant used was an ammonium polyacrylate commercially available as Rhone Poulenc Colloid 102. Polyvinyl alcohol (PVA) having a molecular weight of 100,000 Mn, which was obtained from Air Products and Chemicals Inc under the tradename Airvol was added to the slurries as obtained from CARBO for sample nos. 5 and 6. The solids content reported in Table 1 was determined using a Sartorius moisture balance at 160° C. for 30 minutes. The viscosity data reported in Table 1, (which is reported in centipoises ("cps") at a particular RPM), was determined using a Brookfield viscometer with a number 2 spindle, which is commercially available from Brookfield Engineering Laboratories, Middleboro, Mass. The Brookfield viscometer was operated according to the procedures provided for its operation.

The slurries were atomized according to the Atomization conditions reported in Table 1. Each slurry was fed to a pressure nozzle atomizer at the temperature and feed rate, and under the atomization pressure, reported in Table 1. The particular atomizer used was provided with a Niro Nozzle Tower pilot plant, which had a drying chamber of 2.55 meters in diameter and 5.95 meters in cylindrical height with an overall spray height of 9 meters. The nozzle design was adjusted for each run as reported in Table 1, where the alpha indicator "AA" describes chamber design of the nozzle and the numeric indicator "#.#" describes the diameter (millimeters) of the nozzle orifice. Such alpha and numeric indicators are known and understood by those of ordinary skill in the art. The Duration reported in Table 1 indicates the time that the slurry was pumped at the indicated rate in order to make droplets of the slurry from the particular nozzle used.

As the atomized droplets of slurry exited the pressure nozzle, they were exposed to the Drying Conditions reported in Table 1. Hot air was fed to the drying chamber of the Niro Nozzle Tower pilot plant at the reported rate, which was measured with a hot wire anemometer. The reported inlet and outlet temperatures of the drying chamber were determined with thermocouples. As moisture evaporated from the droplets due to contact with the hot air feed, green ceramic particles were formed having the Green Properties reported in Table 1. The reported residual volatiles % was determined with a Mettler moisture analyzer at 200° C. for 30 minutes, and indicates moisture that did not evaporate from the particle during drying. The poured density represents that amount of green particles that filled a container of known volume, while the tapped density represents that amount of green particles that filled a container of known volume with tapping of the container as it was filled.

The green particles were sintered in a static kiln to produce substantially round and spherical solid ceramic particles. Sintering was achieved using a heating rate of 12° C./min to a peak temperature of 1510° C. with a 30 minute hold at peak temperature. Sintered Properties of the sintered solid ceramic particles such as size, grain fineness number, bulk density, apparent specific gravity and crush strength are reported below. The bulk density, apparent specific gravity and crush strength were determined using API Recommended Practices RP60 for testing proppants.

TABLE 1

| | Sample No. | | | | | | | | |
|---|---|---|---|---|---|---|---|---|---|
| | 1 | 2 | 3 | 4 | 5 | 6 | 7 | 8 | 9 |
| Slurry Properties: | | | | | | | | | |
| Solids (wt %) | 59.2 | 59.6 | 60.4 | 59.7 | 59.6 | 59.2 | 61.1 | 59.8 | 59.3 |
| Binder (PVA) (wt %) | 0 | 0 | 0 | 0 | 0.1* | 0.2* | 0 | 0 | 0 |
| Dispersant (wt %) | 0.3 | 0.3 | 0.3 | 0.3 | 0.3 | 0.3 | 0.3 | 0.3 | 0.3 |
| Density (g/cc) | 1.58 | 1.58 | 1.59 | 1.57 | 1.59 | 1.58 | 1.59 | 1.60 | n/a |
| Viscosity (cps) | | | | | | | | | |
| 6 RPM | 775 | 200 | 1375 | 625 | 875 | 475 | 425 | 225 | 500 |
| 12 RPM | 638 | 163 | 1000 | 450 | 650 | 488 | 350 | 200 | 438 |
| 30 RPM | 440 | 115 | 505 | 315 | 395 | 305 | 255 | 140 | 290 |
| 60 RPM | 335 | 98 | 400 | 250 | 285 | 230 | 200 | 118 | 235 |
| Atomization Conditions | | | | | | | | | |
| Temperature of slurry ° C. | 23 | 22 | 22 | 23 | 23 | 22 | 23 | 22 | 22 |
| Feed Rate of slurry (kg/hr) | 211 | 254 | 254 | n/a | 190 | 233 | n/a | 288 | 220 |
| Atomization Pressure (psig) | 420 | 440 | 600 | 460 | 480 | 440 | 600 | 500 | 500 |
| Nozzle Type | SC 1.6 | SC 1.6 | SB 1.4 | SB 1.4 | SB 1.4 | SB 1.4 | SB 1.5 | SB 1.4 | SB 1.4 |
| Duration (min.) | 24 | 35 | 8 | 27 | 34 | 35 | 12 | 11 | 66 |
| Drying Conditions: | | | | | | | | | |
| Drying Air Rate (kg/hr) | 2930 | 3080 | 3000 | 3080 | 3090 | 3030 | 2730 | 2850 | 2670 |
| Inlet Air Temp. ° C. | 231 | 276 | 221 | 220 | 210 | 210 | 260 | 209 | 231 |
| Outlet Air Temp. ° C. | 118 | 115 | 116 | 110 | 101 | 102 | 126 | 101 | 105 |
| Green Properties: | | | | | | | | | |
| Residual Volatiles, % | 5.35 | 0.98 | 3.15 | 2.71 | 0.61 | 0.65 | 10.9 | 3.0 | 1.35 |
| Poured Density, g/cc | 0.81 | 0.78 | 0.81 | 0.79 | 0.81 | 0.79 | 0.88 | 0.80 | 0.80 |
| Tapped Density, g/cc | 0.86 | 0.85 | 0.86 | 0.84 | 0.86 | 0.85 | 0.91 | 0.87 | 0.85 |
| Particle Size, microns | | | | | | | | | |
| 90% less than | 619 | 500 | 585 | 567 | 530 | 502 | n/a | 578 | 570 |
| 50% less than | 413 | 292 | 353 | 349 | 293 | 306 | n/a | 357 | 351 |

TABLE 1-continued

|  | Sample No. | | | | | | | | |
| --- | --- | --- | --- | --- | --- | --- | --- | --- | --- |
|  | 1 | 2 | 3 | 4 | 5 | 6 | 7 | 8 | 9 |
| 10% less than | 230 | 171 | 213 | 200 | 175 | 188 | n/a | 209 | 186 |
| Product Weight, kg | 49.5 | 72 | 12.5 | 51 | 74 | 72 | 26 | 24 | 140.5 |
| % Retained on Sieve | | | | | | | | | |
| U.S. Mesh No. (or pan) | | | | | | | | | |
| 30 | 5.0 | 0.4 | 5.0 | 0.9 | 0.1 | 0.0 | 31.9 | 0.8 | 0.5 |
| 40 | 34.4 | 7.9 | 23.7 | 20.4 | 4.4 | 1.4 | 31.6 | 16.8 | 7.6 |
| 50 | 32.2 | 31.4 | 32.0 | 35.0 | 26.1 | 20.9 | 20.7 | 36.9 | 32.6 |
| 70 | 16.0 | 27.3 | 22.0 | 21.8 | 30.6 | 32.9 | 9.3 | 23.2 | 35.3 |
| 100 | 8.8 | 19.7 | 12.2 | 14.0 | 24.4 | 28.3 | 4.6 | 14.4 | 14.4 |
| 140 | 2.6 | 8.0 | 3.5 | 5.0 | 9.2 | 10.4 | 1.3 | 5.1 | |
| 200 | 0.6 | 3.1 | 1.0 | 1.7 | 3.1 | 3.3 | 0.3 | 1.6 | 8.7 |
| 270 | 0.2 | 1.5 | 0.4 | 0.8 | 1.5 | 2.0 | 0.2 | 0.8 | |
| pan | 0.1 | 0.7 | 0.2 | 0.4 | 0.6 | 0.7 | 0.1 | 0.3 | 0.9 |
| Avg. Size, microns | 387 | 277 | 354 | 327 | 256 | 236 | 480 | 319 | 285 |
| (including pan material) | | | | | | | | | |
| Sintered Properties: | | | | | | | | | |
| Sieve, U.S. Mesh | | | | | | | | | |
| 30 | 0.6 | 0.1 | 0.6 | 0.1 | 0.0 | 0.0 | 12.5 | 0.1 | 0.0 |
| 40 | 8.6 | 0.8 | 7.0 | 1.7 | 0.2 | 0.1 | 26.9 | 1.7 | 0.8 |
| 50 | 38.8 | 14.6 | 29.1 | 23.9 | 10.1 | 4.4 | 30.5 | 25.1 | 12.9 |
| 70 | 28.5 | 36.1 | 31.9 | 35.2 | 33.3 | 30.8 | 17.0 | 36.3 | 34.6 |
| 100 | 16.8 | 30.0 | 22.2 | 25.2 | 34.0 | 39.4 | 9.4 | 23.9 | 32.2 |
| 140 | 5.0 | 11.3 | 6.4 | 8.9 | 14.3 | 17.0 | 2.7 | 8.3 | 12.8 |
| 200 | 1.3 | 3.9 | 1.7 | 2.8 | 4.6 | 5.0 | 0.7 | 2.7 | 4.1 |
| 270 | 0.4 | 2.3 | 0.8 | 1.5 | 2.6 | 2.5 | 0.3 | 1.3 | 2.1 |
| pan | 0.1 | 1.0 | 0.3 | 0.7 | 0.9 | 0.8 | 0.1 | 0.6 | 0.5 |
| Avg. Size, microns | 300 | 224 | 277 | 247 | 209 | 195 | 395 | 251 | 219 |
| (including pan material) | | | | | | | | | |
| Grain Fineness Number (GFN) (does not include pan material) | 51.9 | 67.1 | 55.9 | 61.6 | 71.1 | 74.4 | 42.1 | 60.5 | 68.3 |
| Grain Fineness Number (GFN) (includes pan material) | 52.2 | 69.5 | 56.6 | 63.3 | 73.2 | 76.2 | 42.4 | 61.9 | 69.5 |
| Bulk Density (g/cc) | 1.53 | 1.39 | 1.50 | 1.47 | 1.44 | 1.39 | 1.52 | 1.46 | 1.46 |
| Apparent Specific Gravity (ASG) | 2.76 | 2.70 | 2.77 | 2.72 | 2.74 | 2.66 | 2.74 | 2.71 | 2.74 |
| Crush on −50/+140: | | | | | | | | | |
| 7500 psi % Crush | 4.4 | 9.6 | 5.2 | 5.5 | 6.4 | 9.5 | 5.1 | 6.7 | 5.2 |
| 10,000 psi % Crush | n/a | 12.3 | 5.9 | 7.5 | 9.3 | 12.8 | 12.3 | 7.9 | 6.6 |

*PVA added after slurries received from preparation site.

Slurries having higher solids loading, (for example, Sample Nos. 3 and 7), produced larger sized particle, by GFN and by average particle size. Sample Nos. 3 and 7 also had a higher viscosity, and produced the 2nd and 3rd coarsest particle size materials by GFN and average particle size. In contrast, slurries having higher total solubles, (for example, Samples Nos. 5 and 6, which included binder), produced the smallest average particle sized material with highest GFN (which also indicates smaller particles were produced). Sample No. 7 produced the largest particles, and it is further noted that of the nine samples, Sample No. 7 also contained the highest residual volatiles, which indicates the free water content of the particles discharged from the drying chamber. The residual volatile content of Sample No. 7 indicates that Sample No. 7 was exposed to a reduced drying rate as compared to those samples discharged from the drying chamber with lower residual volatile contents (for example, Samples Nos. 5 and 6). Thus, a reduced drying rate should contribute to the production of ceramic particles having properties as described herein.

EXAMPLE 2

Referring now to Table 2 below, the results of five test runs that produced substantially round and spherical solid ceramic particles according to the methods disclosed herein are reported. Values reported in Table 2 as "n/a" were not determined.

Five slurries having the Slurry Properties reported in Table 2 were prepared by agitating an uncalcined bauxitic kaolin clay with water and a dispersant in a high shear Cowles dissolver to achieve a slurry having the reported solids content. The clay had an alumina content of greater than about 50 weight percent, and was obtained from J F Blecher. The dispersant was sodium hexametaphosphate, and was included in each slurry in an amount of about 0.15 weight percent of the dry weight of the clay used to make the slurry. Sodium hexametaphosphate is commercially available from Innophous Chemicals Inc. An additional 120 grams of sodium hexametaphosphate was added to Sample Nos. 4 and 5. Ammonium hydroxide was added to each slurry in an amount sufficient to provide the slurries with a pH of about 9.5. No binder other than water was used in any of the slurries.

The slurry solids content reported in Table 2 was determined using a Ohaus MB45 moisture balance at 190° C. until all physical moisture was eliminated.

The viscosity data was determined using a Brookfield RVF viscometer with a number 1 spindle @ 20 rpm, which is commercially available from Brookfield Engineering Laboratories, Middleboro, Mass. The Brookfield viscometer was operated according to the procedures provided for its operation.

Each slurry was fed to a dual fluid nozzle at ambient temperature, and under the atomization pressure, reported in Table 2.

The same nozzle design was used for each sample. The nozzle type was an Air Atomizing Nozzle 1/2JBC, commercially available from Spraying Systems, Inc. The nozzle was configured with a round spray, external mix, spray set up no. SU 70, and pressure set up, according to Spraying Systems Catalog 60B Express (2000), which is a text available to those of ordinary skill in the art for operation of Spraying Systems nozzles. With an external mix, the air inlet for a drying chamber is not within a stream of incoming slurry. The particular dual fluid nozzle atomizer used was used in a pilot tower unit, which had a drying chamber of 1.524 meters in diameter, 4.267 meters in cylindrical height, and a drying volume of 8.59 cubic meters. The overall spray height was 5.587 meters. The drying chamber used in this Example 2 was obtained from Drytec North America LLC, Olympia Fields, Ill.

As the atomized droplets of slurry exited the pressure nozzle, they were exposed to the Drying Conditions reported in Table 2. Hot air was fed to the drying chamber at the reported rate, which was measured using the pressure drop across the cyclone vessel. The reported inlet and outlet temperatures of the drying chamber were determined with type K thermocouples.

As moisture evaporated from the droplets due to contact with the hot air feed, green ceramic particles were formed having the Green Properties reported in Table 2. The reported residual volatiles % was determined with a CSC moisture analyzer based on complete moisture loss on drying, and indicates moisture that did not evaporate from the particle during drying. The poured density represents that amount of green particles that filled a container of known volume, while the tapped density represents that amount of green particles that filled a container of known volume with tapping of the container as it was filled.

Green particles having a sieve size of U.S. mesh 40/270 were sintered in a CM Rapid Temperature static lab kiln to produce substantially round and spherical solid ceramic particles. Sintering was achieved using a heating rate of 17° C./min to a peak temperature of 1500° C. with a 30 minute hold at peak temperature. Sintered Properties of the sintered solid ceramic particles such as size, grain fineness number, bulk density, apparent specific gravity and crush strength are reported below.

The bulk density was determined according to ANSI B74-4-1992 procedures, and the apparent specific gravity and crush strength were determined using API Recommended Practices RP60 for Testing Proppants.

TABLE 2

| | Sample No. | | | | |
|---|---|---|---|---|---|
| | 1 | 2 | 3 | 4 | 5 |
| Slurry Properties: | | | | | |
| Solids (wt %) | 68.8 | 68.8 | 68.8 | 68.8 | 68.8 |
| Dispersant (wt %) | 0.15 | 0.15 | 0.15 | 0.15 + 120 g | 0.15 + 120 g |
| Density (g/cc) | n/a | n/a | n/a | n/a | n/a |
| Viscosity (cps) at 20 RPM | 424 | 424 | 424 | 274 | 274 |
| Atomization Conditions | | | | | |
| Atomization Pressure (psig) | 120 | 120 | 120 | 120 | 120 |
| Drying Conditions: | | | | | |
| Drying Air Rate | N/A | N/A | N/A | N/A | N/A |
| Inlet Air Temp. ° C. | 172 | 156 | 186 | 153 | 175 |
| Outlet Air Temp. ° C. | 129 | 118 | 135 | 118 | 129 |
| Green Properties: | | | | | |
| Residual Volatiles, % | 13.6 | 12.7 | 11.2 | 10.9 | 8.6 |
| Poured Density, g/cc | 1.01 | 1.02 | 1.03 | .96 | .98 |
| Tapped Density, g/cc | 1.06 | 1.06 | 1.08 | 1.02 | 1.05 |
| Particle Size, microns | | | | | |
| 90% less than | 595.2 | 666.9 | 648.2 | 648.6 | 510.3 |
| 50% less than | 243.6 | 315.8 | 281.8 | 299.1 | 57.5 |
| 10% less than | 5.3 | 4.0 | 3.6 | 5.0 | 1.5 |
| % Retained on Sieve | | | | | |
| U.S. Mesh No. (or pan) | | | | | |
| 30 | 29.2 | 34.8 | 35.7 | 30.0 | 21.9 |
| 40 | 17.9 | 18.4 | 16.4 | 18.3 | 17.3 |
| 50 | 16.3 | 15.8 | 14.2 | 16.2 | 17.8 |
| 70 | 13.5 | 12.1 | 11.5 | 13.0 | 15.8 |
| 100 | 9.8 | 8.4 | 8.8 | 9.8 | 12.7 |
| 140 | 5.3 | 4.5 | 4.8 | 5.6 | 6.9 |
| 200 | 2.6 | 2.7 | 2.7 | 2.6 | 3.2 |
| 270 | 2.4 | 1.7 | 2.5 | 1.8 | 1.9 |

TABLE 2-continued

|  | Sample No. | | | | |
| --- | --- | --- | --- | --- | --- |
|  | 1 | 2 | 3 | 4 | 5 |
| pan | 3.0 | 1.6 | 3.4 | 2.6 | 2.5 |
| Avg. Size, microns (including pan material) | 406 | 435 | 426 | 411 | 374 |
| Sintered Properties (40/270 material was sintered): Sieve, U.S. Mesh | | | | | |
| 30 | 0.1 | 0.0 | 0.0 | 0.0 | 0.0 |
| 40 | 6.9 | 7.8 | 7.5 | 6.9 | 6.6 |
| 50 | 29.6 | 29.9 | 30.2 | 29.4 | 31.3 |
| 70 | 25.0 | 27.1 | 26.1 | 26.9 | 26.8 |
| 100 | 19.2 | 18.6 | 17.8 | 18.5 | 16.5 |
| 140 | 10.7 | 9.4 | 9.8 | 10.4 | 10.6 |
| 200 | 4.8 | 4.1 | 4.6 | 4.8 | 4.9 |
| 270 | 2.7 | 2.1 | 2.7 | 2.2 | 2.4 |
| pan | 1.1 | 1.0 | 1.2 | 0.9 | 0.9 |
| Avg. Size, microns (including pan material) | 262 | 269 | 266 | 264 | 266 |
| Grain Fineness Number (GFN) (does not include pan material) | 63.4 | 60.8 | 62.1 | 62.2 | 62.1 |
| Bulk Density (g/cc) | 1.51 | 1.46 | 1.47 | 1.48 | 1.48 |
| Apparent Specific Gravity (ASG) | 2.74 | 2.74 | 2.76 | 2.75 | 2.74 |
| Crush on −50/+140: | | | | | |
| 7500 psi % Crush | 9.6 | 10.5 | 12.1 | 9.7 | 11.5 |

A comparison of Sample No. 2 to Sample No. 3 indicates that when the outlet air temperature (and therefore also the inlet air temperature) of the drying chamber was increased, (118° C. in No. 2 to 135° C. in No. 3), the average green particle size decreased from 435 to 426 microns. A comparison of Sample Nos. 4 and 5 indicates that when the outlet air temperature (and therefore also the inlet air temperature) of the drying chamber was increased, (118° C. in No. 4 to 129° C. in No. 5), the average green pellet size decreased from 411 to 374 microns. Those of ordinary skill in the art understand that a higher outlet air temperature of a drying chamber as described herein indicates a higher inlet air temperature. The reduction of inlet air temperature as between Sample Nos. 2 and 3, and between Sample Nos. 4 and 5 indicate that larger particles can be produced with lower inlet air temperatures.

A comparison of Sample Nos. 2 and 4 indicates that when additional dispersant is present (No. 4 contained 120 g more dispersant than No. 2, and therefore also had a lower viscosity than No. 2), the average green pellet size decreased from 435 to 411 microns. The additional binder and lower viscosity of Sample No. 4 as compared to Sample No. 2 indicates that larger particles can be produced with less binder and higher viscosity (i.e., Sample No. 2.)

In addition, the bulk densities and ASGs reported in Table 2 indicate that at least a portion of the sintered particles were solid.

Further, the values reported in Table 2 show that particles having a size, a bulk density, an apparent specific gravity and a 7500 psi crush strength suitable for use as propping material may be produced from slurries as described herein, and processed with spray dryer technology.

EXAMPLE 3

Referring now to Table 3 below, the results of seven test runs that produced substantially round and spherical solid ceramic particles according to the methods disclosed herein are reported. Values reported in Table 3 as "n/a" were not determined.

Seven slurries having the Slurry Properties reported in Table 3 were prepared by agitating an uncalcined bauxitic kaolin clay with water and a dispersant in a high shear Cowles dissolver to achieve a slurry having the reported solids content. The clay had an alumina content of about 50 weight percent alumina, and was obtained from J F Blecher. The dispersant used was a sodium polyacrylate commercially available under the tradename C-211 from Kemira Chemicals, and was used in the amount reported in Table 3, which is a percent by weight of the dry clay used to make the slurry. Polyvinyl alcohol (PVA) having a molecular weight of 25,000 Mn was added to Sample Nos. 4 and 5 in an amount of about 0.30 percent by weight of the dry clay used to make the slurry. The PVA can be obtained from DuPont under the tradename Elvanol.

The slurry solids content reported in Table 3 was determined using a Ohaus MB45 moisture balance at 190° C. until all physical moisture was eliminated. The viscosity data was determined using a Brookfield RVF viscometer with a number 1 spindle @ 20 rpm, which is commercially available from Brookfield Engineering Laboratories, Middleboro, Mass. The Brookfield viscometer was operated according to the procedures provided for its operation.

The slurries were atomized according to the atomization conditions reported in Table 3. Each slurry was fed to a dual fluid nozzle atomizer at ambient temperature, at the feed rate, and under the atomization pressure, reported in Table 3. The duration reported in Table 3 indicates the time that the slurry was pumped at the indicated rate in order to make droplets of the slurry.

The same nozzle design was used for each Sample reported in Table 3. The nozzle type was an Air Atomizing Nozzle 1/4J, commercially available from Spraying Systems, Inc. The nozzle was configured with a flat spray, external mix, spray set up no. SUE 45, and pressure set up, according to Spraying Systems Catalog 60B Express (2000), which is a text available to those of ordinary skill in the art for operation of Spraying Systems nozzles. The nozzle was configured in a Drytec Nozzle Tower pilot unit, which had a drying chamber of 1.000 meters in diameter and 2.000 meters in cylindrical height with an overall spray height of 2.866 meters.

As the atomized droplets of slurry exited the pressure nozzle, they were exposed to the Drying Conditions reported in Table 3. Hot air was fed to the drying chamber at the reported rate, which was measured using the pressure drop across the cyclone vessel. The reported inlet and outlet temperatures of the drying chamber were determined with type K thermocouples.

As moisture evaporated from the droplets due to contact with the hot air feed, green ceramic particles were formed having the Green Properties reported in Table 3. The reported residual volatiles % was determined with a CSC moisture analyzer based on complete moisture loss on drying, and indicates moisture that did not evaporate from the particle during drying. The poured density represents that amount of green particles that filled a container of known volume, while the tapped density represents that amount of green particles that filled a container of known volume with tapping of the container as it was filled.

The green particles were sintered in a static, Blue M Lindberg lab kiln to produce substantially round and spherical solid ceramic particles. Sintering was achieved using a heating rate of 12° C./min to a peak temperature of 1510° C. with a 30 minute hold at peak temperature. Sintered Properties of the sintered solid ceramic particles such as size, grain fineness number, bulk density, apparent specific gravity and crush strength are reported below.

The bulk density, apparent specific gravity and crush strength were determined using API Recommended Practices RP60 for testing proppants.

TABLE 3

|  | Sample No. | | | | | | |
| --- | --- | --- | --- | --- | --- | --- | --- |
|  | 1 | 2 | 3 | 4 | 5 | 6 | 7 |
| Slurry Properties: | | | | | | | |
| Solids (wt %) | 64.6 | 64.6 | 64.6 | 59.9 | 59.9 | 68.2 | 50.0 |
| Dispersant (wt %) | 0.075 | 0.075 | 0.075 | 0.075 | 0.075 | 0.15 | 0.15 |
| PVA (wt %) | 0 | 0 | 0 | 0.30 | 0.30 | 0 | 0 |
| Density (g/cc) | n/a | n/a | n/a | n/a | n/a | n/a | n/a |
| Viscosity at 20 RPM (centipoises) | 282 | 282 | 282 | 430 | 430 | 334 | n/a |
| Atomization Conditions | | | | | | | |
| Feed Rate of slurry (gal/hr) | 3.5 | 3.5 | 3.5 | 3.5 | 3.5 | 3.5 | 3.2 |
| Atomization Pressure (psig) | 80 | 80 | 70 | 70 | 60 | 60 | 60 |
| Duration (min.) | 11 | 19 | 18 | 18 | 57 | 25 | 43 |
| Drying Conditions: | | | | | | | |
| Drying Air Rate (kg/hr) | 6.08 | 6.08 | 6.08 | 7.25 | 7.25 | 4.35 | 8.35 |
| Inlet Air Temp. ° C. | 274 | 274 | 274 | 274 | 274 | 274 | 274 |
| Outlet Air Temp. ° C. | 104 | 93 | 99 | 104 | 119 | 119 | 119 |
| Green Properties: | | | | | | | |
| Residual Volatiles, % | 3.8 | 4.6 | 4.4 | 1.0 | 0.6 | 8.3 | 0.6 |
| Poured Density, g/cc | 1.20 | 1.20 | 0.85 | 0.81 | 0.79 | 0.97 | 0.76 |
| Tapped Density, g/cc | 1.25 | 1.25 | 0.90 | 0.86 | 0.84 | 1.01 | 0.80 |
| Particle Size, microns | | | | | | | |
| 90% less than | 14.17 | 47.82 | 16.92 | 17.63 | 16.69 | 97.81 | 5.92 |
| 50% less than | 3.13 | 3.51 | 2.82 | 3.16 | 3.74 | 5.21 | 1.64 |
| 10% less than | 0.84 | 0.78 | 0.78 | 0.83 | 0.90 | 1.00 | 1.42 |
| Product Wt. (kg) | 1.248 | 2.187 | 2.061 | 1.087 | 3.458 | 3.958 | 1.144 |
| % Retained on Sieve | | | | | | | |
| U.S. Mesh No. (or pan) | | | | | | | |
| 30 | 0.4 | 0.9 | 2.1 | 0.0 | 0.0 | 5.7 | 0.1 |
| 40 | 1.3 | 4.2 | 4.5 | 0.2 | 0.1 | 15.1 | 0.1 |
| 50 | 5.2 | 8.1 | 9.8 | 0.9 | 0.8 | 21.3 | 0.2 |
| 70 | 12.4 | 12.8 | 13.7 | 3.0 | 4.0 | 25.7 | 0.3 |
| 100 | 18.4 | 17.4 | 17.1 | 7.4 | 10.5 | 18.1 | 0.7 |
| 140 | 19.4 | 17.4 | 17.1 | 7.4 | 10.5 | 18.1 | 0.7 |
| 200 | 14.9 | 13.5 | 13.1 | 16.0 | 16.9 | 3.3 | 9.6 |
| 270 | 14.7 | 12.5 | 11.4 | 19.8 | 20.4 | 1.3 | 32.6 |
| pan | 13.3 | 13.2 | 10.8 | 39.8 | 33.5 | 0.6 | 53.4 |

TABLE 3-continued

|  | Sample No. | | | | | | |
| --- | --- | --- | --- | --- | --- | --- | --- |
|  | 1 | 2 | 3 | 4 | 5 | 6 | 7 |
| Avg. Size, microns (including pan material) | 144 | 167 | 183 | 80 | 88 | 306 | 51 |
| Sintered Properties (30/270 material was sintered) Sieve, U.S. Mesh | | | | | | | |
| 30 | 0.0 | 0.0 | 0.0 | 0.0 | 0.0 | 0.0 | 0.0 |
| 40 | 0.5 | 0.2 | 2.1 | 0.1 | 0.1 | 1.3 | 0.4 |
| 50 | 1.6 | 2.2 | 5.6 | 0.5 | 0.6 | 12.6 | 0.7 |
| 70 | 6.1 | 9.2 | 10.8 | 2.5 | 3.8 | 18.5 | 1.0 |
| 100 | 17.5 | 21.5 | 22.0 | 13.8 | 16.3 | 35.4 | 2.8 |
| 140 | 26.3 | 26.9 | 24.7 | 25.4 | 23.8 | 20.2 | 7.4 |
| 200 | 18.8 | 17.8 | 15.8 | 22.9 | 21.2 | 6.9 | 12.6 |
| 270 | 18.1 | 14.3 | 11.9 | 21.3 | 21.0 | 4.0 | 24.4 |
| pan | 11.1 | 7.9 | 7.1 | 13.5 | 13.2 | 1.1 | 50.7 |
| Avg. Size, microns (including pan material) | 121 | 133 | 154 | 104 | 109 | 199 | 62 |
| Grain Fineness Number (GFN) (does not include pan material) | 118 | 109.7 | 101.5 | 128.6 | 125.6 | 78.7 | 155.6 |
| Bulk Density (g/cc) | 1.47 | 1.44 | 1.45 | 1.28 | 1.26 | 1.58 | 1.22 |
| Apparent Specific Gravity (ASG) | 2.77 | 2.83 | 2.84 | 2.81 | 2.74 | 2.81 | 2.81 |
| Crush on −50/+140: | | | | | | | |
| 7500 psi % Crush | 10.0 | 15.9 | 15.4 | 47.3 | 44.1 | 5.2 | n/a |

The exemplary slurries described in Table 3 illustrate that slurries having a solids content of greater than about 50 weight percent, greater than about 60 weight percent, and greater than about 65 weight percent can be maintained at viscosities suitable for feeding through atomizing equipment of a spray dryer. The solids content of the slurries contributed to the formation of solid, substantially round and spherical particles as described herein.

The bulk densities and ASGs reported in Table 3 indicate that at least some of the sintered particles were solid. The low inlet air temperatures (which are determined by lower outlet air temperatures) used to process the slurries of this Example 3 contributed to the production of solid particles. Moreover, binder was not used to make the solid, substantially round and spherical particles described in Table 3.

In addition, the largest average particle sized material was produced from the highest residual volatile sample (Sample No. 6). The residual volatile content of Sample No. 6 indicates that Sample No. 6 was exposed to a reduced drying rate as compared to those samples discharged from the drying chamber with lower residual volatile contents. Thus, a reduced drying rate should contribute to the production of ceramic particles having properties as described herein.

Further still, the values reported in Table 3 show that particles having a size, a bulk density, an apparent specific gravity and a 7500 psi crush strength suitable for use as propping material may be produced using slurries prepared as described herein, and processed with spray dryer technology.

EXAMPLE 4

Referring now to Table 4 below, the results of seven test runs that produced substantially round and spherical solid ceramic particles according to the methods disclosed herein are reported. Values reported in Table 4 as "n/a" were not determined.

The particles were produced from about a 5 gallon batch of slurry that was prepared by agitating a calcined bauxitic kaolin clay with water and a dispersant in a high shear Cowles dissolver to achieve a slurry having a solids content of about 59.5 weight percent, a viscosity at ambient temperature, 60 RPM, of about 130 centipoises, a pH of about 9.5 (by addition of ammonium hydroxide), and contained about 0.03 wt. percent of a dispersant, based on the weight of the dry clay starting material.

The dispersant was a sodium polyacrylate produced by Kemira Chemicals under the tradename C-211. The clay had an alumina content on a calcined basis of about 47 weight percent, and was obtained as calcined material, (calcined to about 2 wt. % loss on ignition), from CE Minerals, Andersonville Ga.

The slurry was not immediately processed through the spray dryer, and therefore the viscosity had to be modified with additional dispersant to bring the viscosity back to a value such that the slurry could be sprayed. As the first run of slurry was processed, an additional 7.1 grams of the C-211 brand dispersant was added. After the first run, an additional 7.2 grams of the C-211 brand dispersant was added, such that the total amount added to the slurry as batched was 14.3 grams. No additional dispersant was added after the second run, thus, the total amount of additional dispersant remained 14.3 grams, as reported in Table 4.

When sprayed to form particles, the slurries had a solids content and viscosity as reported in Table 4. The slurry solids content reported in Table 4 was determined using an Ohaus MB45 moisture balance at 190° C. until all physical moisture was eliminated. The viscosity data was determined using a Brookfield RVF viscometer with a number 1 spindle @ 20 rpm, which is commercially available from Brookfield Engineering Laboratories, Middleboro, Mass. The Brookfield viscometer was operated according to the procedures provided for its operation.

The slurries were atomized according to the atomization conditions reported in Table 4. Each slurry was fed to a dual fluid nozzle atomizer at ambient temperature, at feed rates and under atomization pressures as reported in Table 4. The duration reported in Table 4 indicates the time that the slurry was pumped at the indicated rate in order to make droplets of the slurry.

The same nozzle design was used for each Sample reported in Table 4. The nozzle type was an Air Atomizing Nozzle 1/4J, commercially available from Spraying Systems, Inc. The nozzle was configured with a flat spray, external mix, spray set up no. SUE 45, and pressure set up, according to Spraying Systems Catalog 60B Express (2000), which is a text available to those of ordinary skill in the art for operation of Spraying Systems nozzles. The nozzle was configured in a Drytec Nozzle Tower pilot unit, which had a drying chamber of 1.000 meters in diameter and 2.000 meters in cylindrical height with an overall spray height of 2.866 meters.

As the atomized droplets of slurry exited the pressure nozzle, they were exposed to the Drying Conditions reported in Table 4. Hot air was fed to the drying chamber at the reported rate, which was measured using the pressure drop across the cyclone vessel. The reported inlet and outlet temperatures of the drying chamber were determined with type K thermocouples.

As moisture evaporated from the droplets due to contact with the hot air feed, green ceramic particles were formed having the Green Properties reported in Table 4. The reported residual volatiles % was determined with a CSC moisture analyzer based on complete moisture loss on drying, and indicates moisture that did not evaporate from the particle during drying. The poured density represents that amount of green particles that filled a container of known volume, while the tapped density represents that amount of green particles that filled a container of known volume with tapping of the container as it was filled.

The green particles were sintered in a static, Blue M Lindberg lab kiln to produce substantially round and spherical solid ceramic particles. Sintering was achieved using a heating rate of 12° C./min to a peak temperature of 1510° C. with a 30 minute hold at peak temperature. Sintered Properties of the sintered solid ceramic particles such as size, grain fineness number, bulk density, apparent specific gravity and crush strength are reported below.

The bulk density, apparent specific gravity and crush strength were determined using API Recommended Practices RP60 for testing proppants.

TABLE 4

| | Sample No. | | | | | | |
|---|---|---|---|---|---|---|---|
| | 1 | 2 | 3 | 4 | 5 | 6 | 7 |
| Slurry Properties: | | | | | | | |
| Solids (wt %) | 56.2 | 56.2 | 56.2 | 56.2 | 56.2 | 56.2 | 56.2 |
| Dispersant (wt % as batched) | 0.03 | 0.03 | 0.03 | 0.03 | 0.03 | 0.03 | 0.03 |
| Additional Dispersant (grams, as sprayed) | 7.1 | 14.3 | 14.3 | 14.3 | 14.3 | 14.3 | 14.3 |
| Viscosity at 20 RPM (centipoises) | 385 | 385 | 385 | 385 | 385 | 385 | 385 |
| Atomization Conditions | | | | | | | |
| Feed Rate of slurry (gal/hr) | 2.0 | 2.0 | 2.0 | 2.0 | 2.0 | 3.0 | 4.0 |
| Atomization Pressure (psig) | 80 | 80 | 80 | 60 | 45 | 45 | 45 |
| Duration (min.) | 30 | 30 | 35 | 10 | 30 | 15 | 15 |
| Drying Conditions: | | | | | | | |
| Drying Air Rate | N/A | N/A | N/A | N/A | N/A | N/A | N/A |
| Inlet Air Temp. ° C. | 227 | 256 | 221 | 219 | 227 | 297 | 313 |
| Outlet Air Temp. ° C. | 118 | 118 | 107 | 107 | 107 | 107 | 107 |
| Green Properties: | | | | | | | |
| Residual Volatiles, % | 3.2 | 3.7 | 1.1 | 3.6 | 2.9 | 7.3 | 11.5 |
| Poured Density, g/cc | N/A | 0.62 | 0.59 | 0.63 | 0.64 | 0.84 | 1.42 |
| Tapped Density, g/cc | N/A | 0.65 | 0.61 | 0.66 | 0.70 | 0.87 | 1.45 |
| Particle Size, microns | | | | | | | |
| 90% less than | N/A | 7.54 | 403.93 | 9.72 | 54.15 | 33.55 | 40.54 |
| 50% less than | N/A | 2.26 | 4.32 | 3.33 | 41.02 | 3.64 | 8.84 |
| 10% less than | N/A | 0.76 | 0.90 | 0.89 | 1.69 | 0.84 | 1.42 |
| Product Wt. (kg) | 0.227 | 0.488 | 0.989 | 0.417 | 1.783 | 1.075 | 2.155 |
| % Retained on Sieve | | | | | | | |
| U.S. Mesh No. (or pan) | | | | | | | |
| 30 | N/A | 0.1 | 0.0 | 0.1 | 0.0 | 0.1 | 0.1 |
| 40 | N/A | 0.1 | 0.1 | 0.1 | 0.2 | 0.8 | 1.8 |
| 50 | N/A | 0.7 | 0.6 | 0.5 | 1.9 | 4.4 | 7.8 |
| 70 | N/A | 3.9 | 3.2 | 2.6 | 6.2 | 9.6 | 12.7 |

TABLE 4-continued

| | Sample No. | | | | | | |
|---|---|---|---|---|---|---|---|
| | 1 | 2 | 3 | 4 | 5 | 6 | 7 |
| 100 | N/A | 8.4 | 6.4 | 5.7 | 12.2 | 14.3 | 16.0 |
| 140 | N/A | 16.2 | 12.6 | 12.2 | 19.6 | 17.9 | 17.8 |
| 200 | N/A | 20.6 | 18.6 | 21.6 | 27.0 | 17.5 | 16.7 |
| 270 | N/A | 30.5 | 32.7 | 32.7 | 22.6 | 19.9 | 17.2 |
| pan | N/A | 19.1 | 24.7 | 24.6 | 9.7 | 15.4 | 10.0 |
| Avg. Size, microns (including pan material) | N/A | 92.8 | 82.7 | 82.6 | 112.6 | 126.9 | 150.9 |
| Sintered Properties (30/270 material was sintered) Sieve, U.S. Mesh | | | | | | | |
| 30 | N/A | 0.5 | 0.2 | 0.0 | 0.0 | 0.1 | 0.2 |
| 40 | N/A | 1.3 | 0.1 | 0.1 | 0.1 | 0.2 | 0.7 |
| 50 | N/A | 2.5 | 0.3 | 0.4 | 1.7 | 3.4 | 1.7 |
| 70 | N/A | 3.2 | 2.0 | 3.0 | 5.9 | 9.4 | 2.5 |
| 100 | N/A | 5.1 | 4.8 | 8.0 | 10.5 | 13.4 | 5.3 |
| 140 | N/A | 8.7 | 7.9 | 13.4 | 16.1 | 17.8 | 10.5 |
| 200 | N/A | 11.8 | 11.4 | 15.8 | 17.3 | 16.9 | 14.9 |
| 270 | N/A | 17.6 | 16.6 | 19.6 | 18.9 | 17.1 | 21.2 |
| pan | N/A | 49.2 | 56.7 | 39.7 | 29.6 | 21.6 | 43.1 |
| Avg. Size (microns) (includes pan material) | N/A | 82.7 | 62.9 | 79.0 | 96.9 | 117.4 | 79.0 |
| Grain Fineness Number (GFN) (does not include pan material) | N/A | 132.3 | 142.1 | 135.9 | 126.5 | 116.4 | 139.7 |
| GFN with pan | N/A | 214.9 | 231.7 | 201.0 | 177.8 | 156.1 | 208.8 |
| Bulk Density (g/cc) | N/A | 1.38 | 1.21 | 1.25 | 1.41 | 1.42 | 1.38 |
| Apparent Specific Gravity (ASG) | N/A | 2.75 | 2.62 | 2.66 | 2.78 | 2.78 | 2.78 |

The exemplary slurries described in Table 4 illustrate that slurries having a solids content of greater than about 50 weight percent can be achieved at viscosities suitable for feeding through atomizing equipment of a spray dryer. The solids content of the slurries contributed to the formation of solid, substantially round and spherical particles as described herein.

The bulk densities and ASGs reported in Table 4 indicate that at least some of the sintered particles were solid. The low inlet air temperatures (which are determined by lower outlet air temperatures) used to process the slurries of this Example 4 contributed to the production of solid particles. Moreover, binder was not used to make the solid, substantially round and spherical particles described in Table 4.

In addition, the largest average particle sized material was produced from the highest residual volatile sample (Sample No. 7). The residual volatile content of Sample No. 7 indicates that Sample No. 7 was exposed to a reduced drying rate as compared to those samples discharged from the drying chamber with lower residual volatile contents. Thus, a reduced drying rate should contribute to the production of ceramic particles having properties as described herein.

EXAMPLE 5

From the methods developed through Examples 1-4, it is possible to estimate the dimensions of spray drying equipment, in particular, the drying chamber, that could produce particles larger still than those actually produced in Examples 1-4.

Referring now to FIG. 4, an estimate of desirable equipment dimensions is illustrated. The heights of the drying chambers of Examples 2 and 3, and the volume of the green particles produced therein are plotted on FIG. 4 at points 1 and 2, respectively. Point 3 on FIG. 4 corresponds to the height (about 9.8 m) of a production spray drying chamber manufactured by, and available for testing at, American Custom Drying. Assuming a linear relationship established by points 1 and 2, a drying chamber having a 9.8 m height should produce a green pellet volume of about 0.110 $mm^3$. Continuing the assumption of a linear relationship, points 4 and 5 plotted on FIG. 4 correspond to a desired green pellet volume of about 0.212 $mm^3$ and 0.234, respectively. Given such desired green pellet volume, the estimated height of the drying chamber the estimated height of a drying chamber for making such volumes were estimated and completed the plotting of points 4 and 5.

As illustrated in FIG. 4, the estimated height of a drying chamber for making 30/50 proppant sized pellets (approximately an average green pellet size of 765 microns) would be 19.8 meters. Utilizing industrial screening machines such as Rotex Inc Model 522, the dried pellets may be screened, providing proppant pellets sized to yield 20/40, 20/30, or 18/40 products.

A drying chamber having a height of 19.8 meters as described herein could have a diameter of about 7.4250 meters and a volume of about 857.33 $m^3$. Those of ordinary skill in the art would recognize that the dimensions of the drying chamber described in this Example 5 can vary, and that other diameters and ratios can be designed.

Selection of dimensions of for the drying chamber, in combination with the methods already discussed herein, namely, maximizing the solids content of the slurry, minimizing the amounts of solubles (e.g., dispersants and/or binders) in the slurry) while still maintaining a sprayable viscosity, lowering the inlet and outlet air temperatures fed to the drying chamber, should produce substantially round and spherical solid ceramic particles, that, when sintered, have an average particle size, bulk density, apparent specific gravity and crush strength suitable for use as proppant material.

According to the present methods, solid spherical ceramic particles are produced by adjusting one or more of (1) solids content (preferably higher solids content in the slurry); (2) solubles content (preferably minimal or no dispersant and/or binder in the slurry); and (3) air inlet temperatures (preferably a low temperature to slow the drying rate of the particles). In addition, controlling the drying air flow rates through the drying chamber (preferably a low rate), can contribute to the production of solid spherical ceramic particles as described herein. Moreover, selection of equipment dimensions, such as the height of the drying chamber of the spray dryer, can enhance the average size of the particles produced according to methods described herein.

The substantially round and spherical solid ceramic particles that are produced according to the methods described herein are suitable for a variety of uses, including but not limited to use as a proppant in oil or gas wells, and as a foundry media. Other embodiments of the current invention will be apparent to those skilled in the art from a consideration of this specification or practice of the invention disclosed herein. However, the foregoing specification is considered merely exemplary of the current invention with the true scope and spirit of the invention being indicated by the following claims.

What is claimed is:

1. A method for producing solid sintered ceramic particles that are substantially round and spherical comprising:
    preparing a slurry having a solids content of about 50 to about 75% by weight, and comprising water, a ceramic starting material and a dispersant, which ceramic starting material has an alumina content of greater than about 40 weight percent, and which dispersant is added to the slurry in an amount of 0.075 weight percent to 1.0 weight percent by weight of the dry ceramic starting material and is selected from the group consisting of colloids, polyelectrolytes, tetra sodium pyrophosphate, tetra potassium pyrophosphate, polyphosphate, ammonium citrate, ferric ammonium citrate and sodium hexametaphosphate and;
    feeding the slurry to an atomizer operably connected to a dryer;
    operating the atomizer to atomize the slurry into droplets;
    operating the dryer to provide an air inlet temperature in a range of from about 100° C. to about 500° C.;
    forming solid substantially round and spherical particles by allowing the droplets to pass through the dryer and exit through a discharge of the dryer;
    sintering at least a portion of the particles discharged from the dryer at a temperature of from about 1000° C. to about 1600° C. for a time at peak temperature of from about 20 to about 45 minutes, wherein sintered, solid, substantially round and spherical particles are formed having an average particle size of greater than about 200 microns, an average bulk density of greater than about 1.40 g/cc, and an average apparent specific gravity of greater than about 2.60.

2. The method of claim 1 wherein the air inlet temperature is in a range selected from the group consisting of from about 100° C. to about 200° C., from about 200° C. to about 300° C., from about 300° C. to about 400° C., and from about 400° C. to about 500° C.

3. The method of claim 1 wherein the air inlet temperature is in a range selected from the group consisting of from about 150° C. to about 200° C. and from about 200° C. to about 250° C.

4. The method of claim 1 further comprising:
    adding a binder to the slurry before feeding the slurry to the atomizer, wherein the binder is added to the slurry in an amount of less than about 0.5 weight percent, by weight of the ceramic starting material.

5. The method of claim 1 further comprising:
    adding a binder to the slurry before feeding the slurry to the atomizer, wherein the binder is added to the slurry in an amount of less than about 1.0 weight percent, by weight of the ceramic starting material.

6. The method of claim 1, wherein the dispersant is added to the slurry in an amount of 0.075 weight percent to about 0.3 weight percent by weight of the dry ceramic starting material.

7. The method of claim 1, wherein the dispersant is added to the slurry in an amount of 0.075 weight percent to about 0.5 weight percent by weight of the dry ceramic starting material.

8. The method of claim 1 wherein the ceramic starting material is selected from the group consisting of calcined material, uncalcined material, partially calcined material, and mixtures thereof.

9. The method of claim 1 wherein the ceramic starting material is selected from the group consisting of kaolin clay, bauxitic kaolin and bauxite.

10. The method of claim 1 wherein the atomizer is selected from the group consisting of rotary wheel atomizers, pressure nozzle atomizers and dual fluid nozzle atomizers.

11. A method for producing solid sintered ceramic particles that are substantially round and spherical comprising:
    preparing a slurry having a solids content of about 50 to about 75% by weight, and comprising water, a ceramic starting material and a dispersant, which ceramic starting material has an alumina content of greater than about 40 weight percent, and which dispersant is added to the slurry in an amount of 0.075 weight percent to 1.0 weight percent by weight of the dry ceramic starting material and is selected from the group consisting of colloids, polyelectrolytes, tetra sodium pyrophosphate, tetra potassium pyrophosphate, polyphosphate, ammonium citrate, ferric ammonium citrate and sodium hexametaphosphate;
    feeding the slurry to an atomizer operably connected to a dryer;
    feeding drying air into the dryer;
    operating the atomizer to atomize the slurry into droplets;
    forming solid substantially round and spherical particles by allowing the droplets to pass through the dryer; and
    controlling at least one of the solids content of the slurry, the temperature of the drying air entering the dryer, and the feed rate of the drying air entering the dryer so as to produce solid substantially round and spherical particles, that when sintered at a temperature of from about 1000° C. to about 1600° C. for a time at peak temperature of from about 20 to about 45 minutes, have an average particle size of greater than about 200 microns, an average bulk density of greater than about 1.40 g/cc, and an average apparent specific gravity of greater than about 2.60.

12. The method of claim 11 further comprising:

adding a binder to the slurry; and controlling the amount of the binder and the dispersant so as to produce the sintered, solid substantially round and spherical particles having an average particle size of greater than about 200 microns, an average bulk density of greater than about 1.40 g/cc, and an average apparent specific gravity of greater than about 2.60.

13. The method of claim 12 wherein the binder is selected from the group consisting of polyvinyl alcohol, polyvinyl acetate, methylcellulose, dextrin and molasses.

14. The method of claim 11 further comprising:

adjusting a dimension of the dryer so as to adjust at least one of the average particle size, bulk density and apparent specific gravity of the solid substantially round and spherical particles.

15. The method of claim 14 wherein the height of the dryer is increased so as to increase the average particle size of the solid substantially round and spherical particles.

* * * * *

UNITED STATES PATENT AND TRADEMARK OFFICE
CERTIFICATE OF CORRECTION

PATENT NO. : 7,387,752 B2  
APPLICATION NO. : 11/178081  
DATED : June 17, 2008  
INVENTOR(S) : Steve Canova et al.

Page 1 of 1

It is certified that error appears in the above-identified patent and that said Letters Patent is hereby corrected as shown below:

Column 23, line 42, change "polyclectrolytes" to -- polyelectrolytes --.

Column 24, line 46, change "polyclectrolytes" to -- polyelectrolytes --.

Signed and Sealed this

Twenty-third Day of September, 2008

JON W. DUDAS  
*Director of the United States Patent and Trademark Office*